W. H. NEWELL.
Injector.
No. 161,815. Patented April 6, 1875.
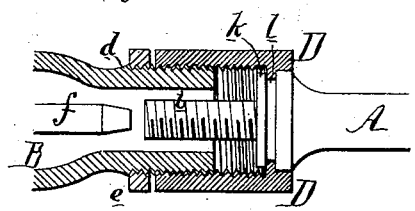
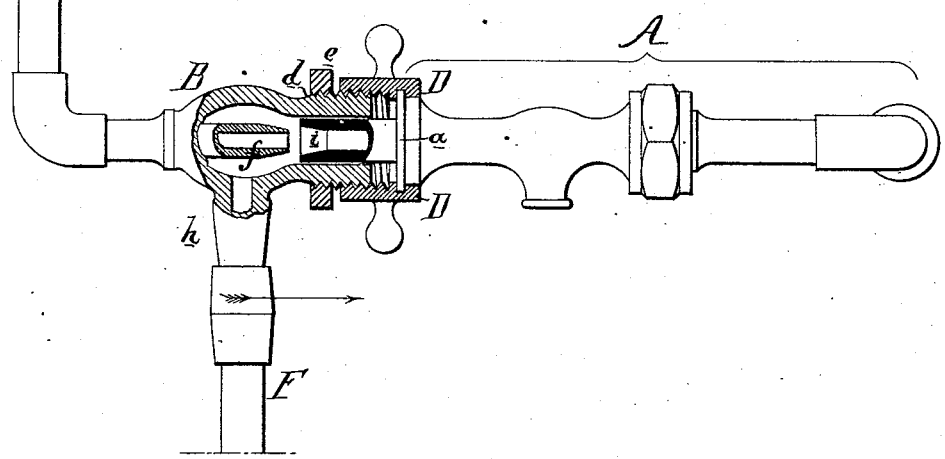
Witnesses,
Harry Smith
Hubert Howson
William H. Newell,
by his Attorneys
Howson & Son

UNITED STATES PATENT OFFICE.

WILLIAM H. NEWELL, OF PHILADELPHIA, PENNSYLVANIA.

IMPROVEMENT IN INJECTORS.

Specification forming part of Letters Patent No. 161,815, dated April 6, 1875; application filed March 6, 1875.

*To all whom it may concern:*

Be it known that I, WILLIAM H. NEWELL, of Philadelphia, Pennsylvania, have invented certain Improvements in Injectors, of which the following is a specification:

The object of my invention is to so construct an injector that the adjustment of the steam-nozzle can be readily accomplished without the aid of the complex and costly appliances heretofore used for the purpose; and a further object of my invention is to readily take the injector apart for cleansing purposes.

These objects I attain in the manner which I will now proceed to describe, reference being had to the accompanying drawing, representing, partly in section, an injector made according to my improvements.

The injector consists of two main parts—namely, the body A, which is of the same, or substantially the same, construction as the rear portion of an ordinary injector, and the part B, which is made separate from A—the two parts being coupled together by a nut, D, the latter having an internal annular groove for receiving a collar, a, on the part A of the injector, on which the nut can revolve freely, but cannot move longitudinally, the threaded portion of the nut being adapted to the threaded branch d of the part B, the said branch being provided with a nut, e, referred to hereafter.

The part B of the injector contains the usual steam-nozzle f, communicating with the steam-pipe E, and has the usual branch h, connected to and communicating with the suction-pipe F. The pipes E and F must be so arranged and secured at such points that they will possess sufficient elasticity to yield and permit the part B to be adjusted from or toward the part A.

The adjustment of the nozzle f in respect to the receiving-tube i can thus be easily accomplished by the manipulation of the nut D, and the usual complex adjusting appliances of ordinary injectors are dispensed with.

An important advantage of my invention is the facility with which the two parts of the injector can be separated for the ready cleansing of the interior, all that is necessary being to uncouple the two parts by turning the nut D, when the cleansing may be accomplished without detaching either part from its bearings or supports.

The nut e, in addition to its duty as a jam-nut, serves the purpose of determining the adjustment of the nozzle h, for, in recoupling the two parts of the injector, the said nut e will prevent the parts from being drawn closer together than the proper or predetermined adjustment of the nozzle requires.

Figure 2 illustrates a modification of the invention, in which the nut D has a shoulder instead of a groove, and is retained in its position by a sleeve, k, and collar l on the receiving-tube i.

I claim as my invention—

1. An injector composed of two parts, A and B, combined with the coupling-nut D, substantially as and for the purpose herein described.

2. The two-part injector and coupling-nut D, in combination with steam and suction pipes E and F, arranged to yield in the manner and for the purpose described.

In testimony whereof I have signed my name to this specification in the presence of two subscribing witnesses.

WM. H. NEWELL.

Witnesses:
HUBERT HOWSON,
HARRY SMITH.